United States Patent [19]

Hanson

[11] 3,894,226

[45] July 8, 1975

[54] PHOTOFLASH LAMP ARRAY HAVING MEANS FOR PREVENTING ELECTRICAL SHORTING

[75] Inventor: James M. Hanson, Euclid, Ohio

[73] Assignee: General Electric Company, Schenectady, N.Y.

[22] Filed: Sept. 26, 1974

[21] Appl. No.: 509,411

[52] U.S. Cl. .............................. 240/1.3; 240/103 R

[51] Int. Cl. ........................................... G03b 15/02

[58] Field of Search ......................... 240/1.3, 103 R; 317/101 CC, 101 DH, 101 F; 339/17 R; 354/126, 127, 148; 431/92, 93, 95 R, 95 A

[56] References Cited

UNITED STATES PATENTS

| | | | |
|---|---|---|---|
| 3,127,112 | 3/1964 | McCammon et al. | 240/1.3 |
| 3,458,270 | 7/1969 | Ganser et al. | 240/1.3 X |
| 3,598,984 | 8/1971 | Slomski | 240/1.3 |
| 3,608,451 | 9/1971 | Kelem | 240/1.3 X |

*Primary Examiner*—Fred L. Braun

*Attorney, Agent, or Firm*—Norman C. Fulmer; Lawrence R. Kempton; Frank L. Neuhauser

[57] ABSTRACT

A photoflash lamp array comprising a plurality of flash lamps having lead-in wires connected to a circuit board containing thereon radiation-sensitive switching circuitry for sequentially flashing the lamps. An electrically conductive reflector unit is positioned between the lamps and the circuit board, and an electrically insulating sheet member is interposed between the reflector unit and the circuit board to prevent shorting of the circuitry on the circuit board by the conductive reflector. The insulating sheet member may be of plastic which transmits sufficient radiation from a flashing lamp to actuate an adjacent radiation switch in the switching circuitry.

4 Claims, 3 Drawing Figures

PHOTOFLASH LAMP ARRAY HAVING MEANS FOR PREVENTING ELECTRICAL SHORTING

CROSS-REFERENCE TO RELATED APPLICATIONS

Ser. No. 448,671, filed Mar. 6, 1974, Kurt H. Weber, "Multiple Flash Lamp Unit," assigned the same as this invention.

Ser. No. 485,459, filed July 3, 1974, Richard Blount, "Multiple Flash Lamp Unit," assigned the same as this invention.

Ser. No. 485,422, filed July 3, 1974, Paul T. Coté, "Multiple Flash Lamp Unit," assigned the same as this invention.

Ser. No. 485,460, filed July 3, 1974, Paul T. Coté, "Protective Terminal for Multiple Flash Lamp Unit," assigned the same as this invention.

Ser. No. 499,316, filed Aug. 21, 1974, Paul T. Coté, "Connector for Photoflash Array," assigned the same as this invention.

Ser. No. 508,334, filed Sept. 23, 1974, Richard Blount, "Photoflash Array Construction," assigned the same as this invention.

Ser. No. 509,410, James M. Hanson, filed concurrently herewith, "Photoflash Lamp Array Having Electrically Connected Reflector," assigned the same as this invention.

BACKGROUND OF THE INVENTION

The invention is in the field of multiple photoflash lamp units, such as planar arrays.

The above-referenced patent applications disclose multiple flash lamp arrays comprising a plurality of flash lamps having their lead-in wires connected to a circuit board provided with switching circuitry for causing sequential flashing of the lamps, and reflectors are positioned between the lamps and the circuit board. As is particularly disclosed in the first two above-referenced Coté patent applications, the reflectors for the lamps can be made as a single reflector member or unit shaped to provide multiple individual reflectors for the lamps. The reflector member preferably is electrically conductive, such as by being made of metal or metal-coated plastic, and is electrically connected to an electrical "ground" portion of the circuitry on the circuit board. Thus, the reflector member functions as an electrical shield and increases the stray capacitance to ground of the electrical "ground" of the circuitry, reducing the possibility of accidental flashing of lamps by electrostatic voltage charge on a person or object touching the array, which accidental flashing is particularly prone to occur if the lamps are high voltage types requiring a firing voltage of 1000 or 2000 volts, for example, at low current.

Although an electrically conductive reflector is desirable, as has just been explained, care must be taken to prevent the reflector unit from shorting the circuitry on the circuit board, which is located immediately behind the reflector unit, thus preventing the circuit from flashing the lamps. A partially successful way of achieving this is to make the reflector unit of plastic, and provide a coating of aluminum or other suitable reflective and electrically conductive material only over its front surface, whereby the back of the unit cannot cause shorting on the circuit board. This approach has not been entirely successful, however, because when applying the metal coating to the front of the reflector unit, such as by spraying or by vapor deposition, there is a tendency for some of the metal to seep or splash through openings at the rear of the unit and provide small areas of metal on the back surface of the unit which may cause shorting on the adjacent circuit board. Since the metal of the reflector is connected to a point of the circuit, as explained above, even a small area of metal on the back of the reflector unit can cause a short if it touches another point of the circuit. The just-mentioned openings through the reflector cannot be eliminated because they are necessary for permitting lead-in wires of the flash lamps to be connected to the circuit board. Other openings are also desirable through the reflector unit to facilitate operation of radiation-sensitive switches on the circuit board, and of flash indicators behind the board, which are actuated by radiation from flashing lamps.

SUMMARY OF THE INVENTION

Objects of the invention are to provide an improved flash array construction and to provide a feasible and economical way of preventing short-circuiting of a firing sequencing circuit by an adjacent conductive reflector member.

The invention comprises, briefly and in a preferred embodiment, a multiple flash lamp array containing a plurality of flash lamps having lead-in wires connected to a circuit board carrying circuitry for flashing the lamps. An electrically conductive reflector unit is positioned between the lamps and the circuit board, and an electrically insulating sheet member is interposed between the reflector unit and the circuit board to prevent shorting of the circuitry on the circuit board by the conductive reflector. The insulating sheet member may be of plastic which transmits sufficient radiation from flashing lamps to actuate adjacent radiation switches in the switching circuitry, and also to actuate flash indicators located behind the board, and/or small openings may be provided through the sheet to facilitate radiation transfer. The array can include features disclosed in the above-referenced patent applications, including lamp arrangement and connections so that the array can be attached to a camera in different orientations in each of which only a group of lamps relatively far away from the camera lens axis will be flashed, thereby reducing the likelihood of an undesirable "red-eye" effect which causes a person's pupils to appear red if the flashing lamp is close to the lens axis.

DESCRIPTION OF THE PREFERRED EMBODIMENT

Figure 1:
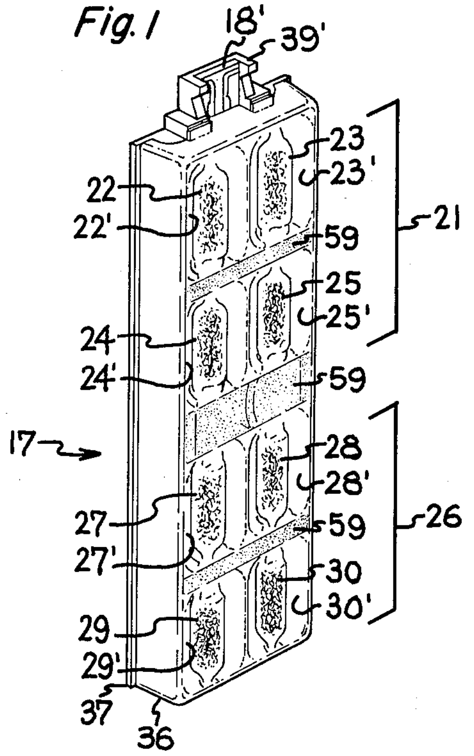
FIG. 1 is a perspective view of a multiple flash lamp array in accordance with a preferred embodiment of the invention.
Figure 3:
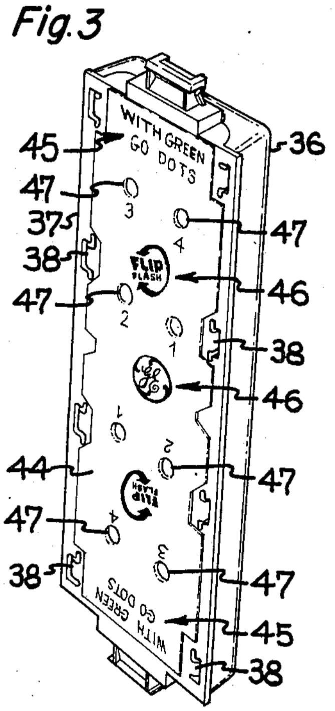
FIG. 3 is a perspective view of the back of the array.

A multiple flash lamp unit 17 of the planar array type and containing a plurality of electrically fired flash lamps is provided with a plug-in connector tab 18 at the lower side or end thereof, adapted to fit into a socket of a camera or flash adapter as shown and described in the above-referenced patent applications. The lamp array 17 is provided with a second plug-in connector tab 18' at the top side or end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. Reflectors 22', etc., are disposed behind the respective flash lamps, so that as each lamp is flashed its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the above-referenced patent applications.

The construction of the array, most of which is also disclosed in the last above-referenced Blount application, comprises front and back housing members 36 and 37, which preferably are made of plastic and are provided with interlocking members 38 which can be molded integrally with the housing members and which lock the housing members together in final assembly to form a unitary flash array structure. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., an electrically conductive unitary reflector member 41 (preferably of aluminum-coated plastic) shaped to provide the individual reflectors 22', etc., an electrically insulating sheet 42, a printed circuit board 43 provided with integral connector tabs 18 and 18', and an indicia sheet 44 which may be provided with instructions, information 45, trademarks 46, and other indicia such as flash indicators 47 located behind the respective lamps and which change color due to heat and/or light radiation from a flashing lamp, thus indicating at a glance which of the lamps have been flashed and not flashed.

The indicia sheet 44 may be of paper or thin cardboard and provided with openings where the flash indicators 47 are desired, and flash indicator material, such as a sheet-like heat-sensitive plastic material, for example biaxially oriented polypropylene, which shrinks or melts when subjected to heat or radiant energy from an adjacent flashing lamp thus effectively changing the color of the openings in the indicia sheet 44. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 48 may be arranged over all of the flash indicator openings. Openings 51 are provided through the reflector unit 41 and the circuit board 43 to facilitate radiation from flashing lamps reaching the flash indicators 47. The rear housing member 37 is transparent (either of clear material or provided with window openings) to permit viewing of the indicia on the indicia sheet 44. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41, insulating sheet 42, and circuit board 43 are substantially the same as the interior height and width of the housing member 36, to facilitate holding the parts in place.

The tab 18, which is integral with the circuit board 43, is provided with a pair of electrical terminals 31 and 32, and similarly the tab 18' is provided with a pair of terminals 31' and 32', for contacting terminals of a camera socket for applying firing voltage pulses to the array. Each tab is provided with a third terminal 33 and 33', respectively, which functions to electrically short the circuitry of the inactive lower group of lamps, when the array is plugged into a socket, as is described in the first above-referenced Blount patent application. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled, as is disclosed in the above-referenced Coté patent application Ser. No. 485,460.

The circuit board 43 has a "printed circuit" thereon, as will be described, for causing sequential flashing of the lamps by firing voltage pulses applied to the terminals 31, 32 or 31',32'. The top and bottom halves of the printed circuitry preferably are reverse mirror images of each other. The lead wires 22*a*, 22*b*, etc., of the lamps 22, etc., may be attached to the circuit board 43 in various ways, such as by means of metal eyelets **22*a*', 22*b*'**, etc., placed through openings in the board. The lead wires 22*a*, 22*b*, etc., pass through openings 52 in the reflector member 41, and through openings 53 in the insulating sheet 42, and into or through the respective pairs of eyelets **22*a*', 22*b*', etc., and the ends of the eyelets are crimped or bent to hold the lead wires and make electrical contact thereto and also to hold the eyelets in place with their heads in electrical contact with the circuit of the circuit board. A metal clip 56 is clipped onto the reflector member 41, which reflector is preferably made of metal-coated plastic, and the rear of the clip 56 rests in touching contact against an area 57 of an electrical ground circuit run 58 on the board and which includes the terminals 31 and 31' and which makes contact with one of the connector eyelets 22*a*' or 22*b*', etc., for each of the lamps 22, etc., whereby the reflector unit 41** additionally functions as an electrically grounded shield, as is described in the above-referenced Hanson patent application.

Areas 59 on the transparent front housing member 36 may be made opaque or partly opaque, such as by making the surface roughened at these areas, to fully or partly conceal the lamp lead-in wires 22*a*, 22*b*, etc., and/or the lower portions of the lamps, for improved appearance of the array.

The circuit board terminal 32 is part of a conductor run that is electrically connected to lead-in wire **24*a* of lamp 24 at the eyelet 24*a*' and terminates at radiation switches 61, 62, and 63 respectively positioned near lamps 24, 25, and 23. A circuit board conductor run 64 is connected electrically to the remaining lead wire of flash lamp 25 at eyelet 25***a'* and terminates at the radiation switch 61. A circuit board conductor run 65 is connected to the remaining lead-in wire of flash lamp 23 at eyelet 23*a'* and terminates at the radiation switch 62. Similarly, a circuit board conductor run 66 is connected to the remaining lead-in wire of flash lamp 22 at eyelet 22*b'* and terminates at radiation switch 63.

Figure 2:
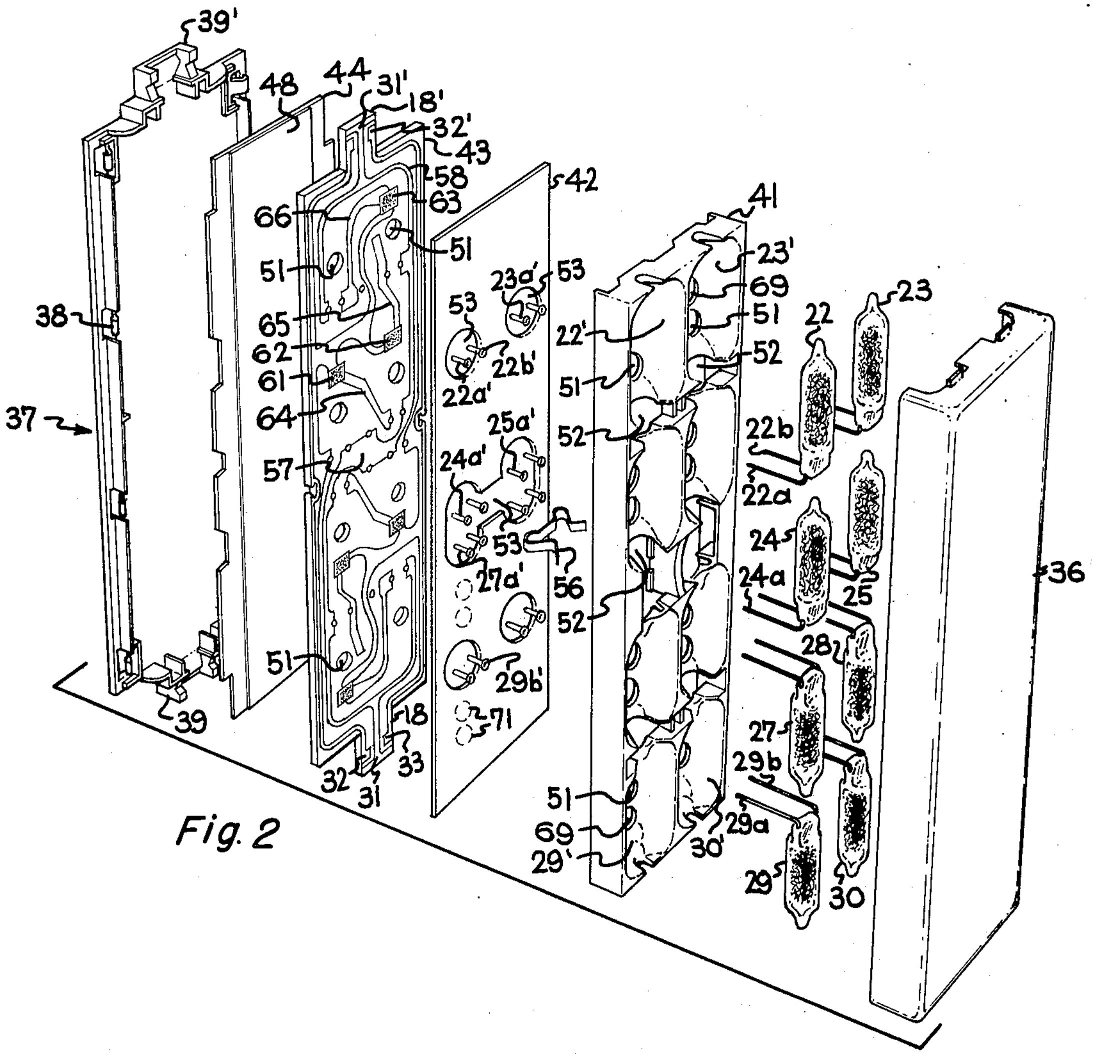
FIG. 2 is an exploded view of the array of FIG. 1 showing the internal parts.

The radiation switches 61, 62, and 63 respectively are in contact with and bridge across the circuit runs that are connected to them. The material for the radiation switches may be suitable material initially having an open circuit or high resistance, the resitance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 43 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25*a'*. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around the other connector tab 18' attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts for example, at low current, for flashing, and they can be fired by impacting or stressing a piezoelectric element in the camera, as disclosed in U.S. Pat. Nos. 2,972,937 and 3,106,080 to C. G. Suits.

As disclosed in the first two above-referenced Coté patent applications, the conductive reflector unit 41 is connected to the more readily touchable electrical ground terminals 31 and 31' of the array, so that when these terminals are touched by an electrostatically charged person or object, the reflector unit functions as a shield (connected to the terminals 31 and 31') having relatively large stray capacitance to ground, whereby a relatively large amount of the electrostatic voltage will be dissipated to ground rather than flowing through the primers or other flash ignition means of the lamps 22, etc.

In accordance with the invention, the electrically insulative sheet 42 is provided between the reflector unit 41 and the circuit board 43. As pointed out above, since the reflector unit 41 is electrically conductive and is connected to electrical ground of the circuit so as to function as a shield, any conductive areas on the back surface of the reflector unit could, but for the sheet 42, touch circuit runs or switches 61, etc., on the circuit board and cause a short circuit which would prevent the sequencing circuitry from functioning. The sheet 42 may be thin, such as a few thousandths of an inch thick, and made of plastic such as cellulose acetate which transmits a sufficient amount of radiation (heat and/or light) from flashing lamps to actuate the switches 61, etc., and flash indicators 47. If desired, small openings 71, indicated with dashed lines in FIG. 2, can be provided through the sheet 42 in alignment with the openings 51 and 69 in the reflector unit 41 to improve radiation transfer. Use of the insulator sheet 42 permits the reflector unit 41 to be very close to the circuit board 43, resulting in a compact array construction, and prevents shorting of the circuit by the reflector unit. Also, use of the insulator sheet 42 reduces the time and cost of manufacturing the metal-coated plastic reflector unit 41, since it is not necessary to try to prevent metal from seeping onto the back surface of the unit.

While preferred embodiments of the invention have been shown and described, various other embodiments and modifications thereof will become apparent to persons skilled in the art, and will fall within the scope of the invention as defined in the following claims.

What I claim as new and desire to secure by Letters Patent of the United States is:

1. A photoflash lamp array comprising a circuit board having lamp-firing circuitry on a surface thereof, a plurality of flash lamps positioned over said surface and having lead-in wires connected to said circuitry, and an electrically conductive reflector unit positioned between said lamps and said circuit board, wherein the improvement comprises a sheet of electrically insulating material interposed between said reflector unit and said circuit board.

2. An array as claimed in claim 1, in which said circuitry comprises switches adapted to be actuated by radiation from flashing lamps, and in which said sheet is made of a plastic material which transmits said radiation.

3. An array as claimed in claim 1, in which said circuitry comprises switches adapted to be actuated by radiation from flashing lamps, and in which said sheet is provided with openings over said switches.

4. An array as claimed in claim 1, including means electrically connecting said reflector unit to said circuitry on the circuit board.

* * * * *